United States Patent [19]

Takimoto

[11] Patent Number: 4,686,589
[45] Date of Patent: Aug. 11, 1987

[54] RECORDING AND REPRODUCING APPARATUS HAVING AN AUTOMATIC TRACKING CONTROL SYSTEM USING MULTIPLE PILOT SIGNALS

[75] Inventor: Hiroyuki Takimoto, Kanagawa, Japan

[73] Assignee: Canon Kabushiki Kaisha

[21] Appl. No.: 936,974

[22] Filed: Nov. 26, 1986

Related U.S. Application Data

[63] Continuation of Ser. No. 559,222, Dec. 8, 1983, abandoned.

[30] Foreign Application Priority Data

Dec. 13, 1982 [JP] Japan ................. 57-219061

[51] Int. Cl.⁴ ...................... G11B 5/52; G11B 15/467
[52] U.S. Cl. ........................................ 360/77; 360/70
[58] Field of Search ............... 360/70, 73, 75, 77, 360/61, 18, 27, 10.2, 10.3, DIG. 1; 358/312, 323

[56] References Cited

U.S. PATENT DOCUMENTS

| | | | |
|---|---|---|---|
| 4,056,832 | 11/1977 | de Boer et al. | 360/77 |
| 4,237,500 | 12/1980 | Sanderson | 360/77 |
| 4,297,733 | 10/1981 | Sanderson | 360/77 |
| 4,306,261 | 12/1981 | Bergmans et al. | 360/77 |
| 4,309,730 | 1/1982 | Sanderson | 360/77 |
| 4,364,097 | 12/1982 | De Boer et al. | 360/77 |
| 4,439,799 | 3/1984 | Haubrich et al. | 360/77 |
| 4,497,000 | 1/1985 | Terada et al. | 360/77 |
| 4,509,083 | 4/1985 | Nakano | 360/77 |

FOREIGN PATENT DOCUMENTS

| | | | |
|---|---|---|---|
| 0089816 | 9/1983 | European Pat. Off. | 360/77 |
| 0094194 | 11/1983 | European Pat. Off. | 360/75 |

Primary Examiner—Raymond F. Cardillo
Assistant Examiner—Steven R. Garland
Attorney, Agent, or Firm—Toren, McGeady & Associates

[57] ABSTRACT

An apparatus for reproducing an information signal which was recorded along with one of four successive pilot signals of different frequencies from one another for every one track of a recording medium in a prescribed rotation, including a reproducing head for tracing the recording track, apparatus for selectively producing four reference signals of substantially the same frequencies as those of the respective pilot signals one at a time in a rotation different from the prescribed rotation, and apparatus for detecting a position error of the reproducing head relative to the recording track by using the four reference signals and at least one of the four pilot signals reproduced through the reproducing head.

8 Claims, 15 Drawing Figures

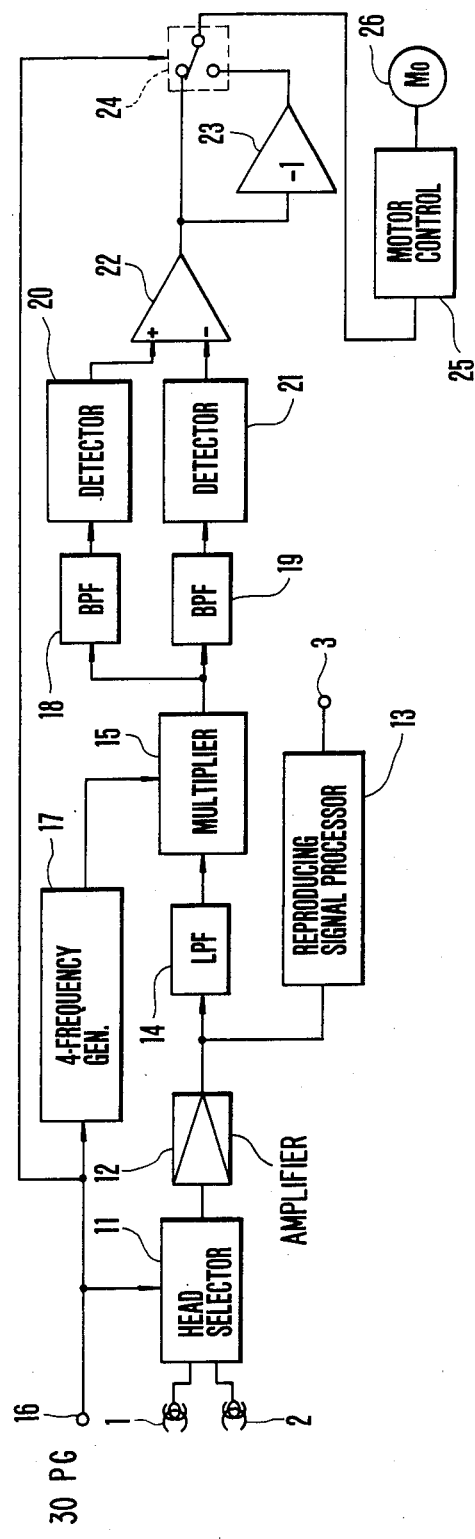
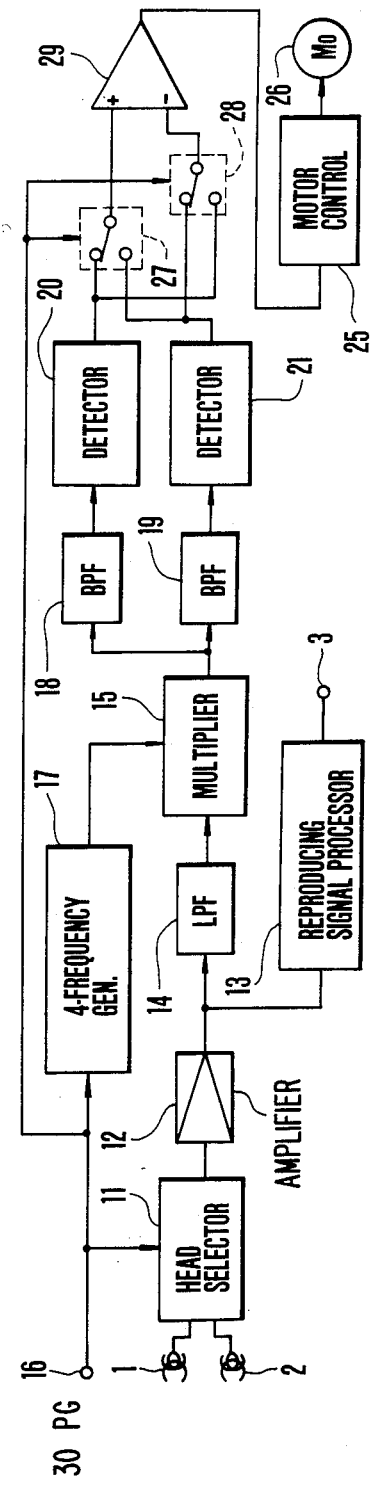
FIG. 1 PRIOR ART
FIG. 2 PRIOR ART

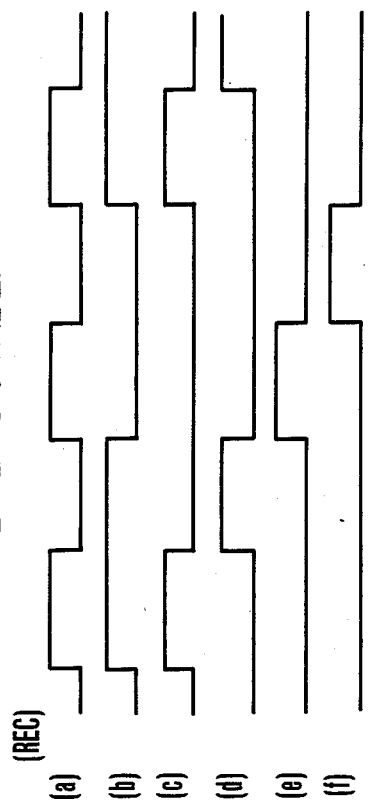
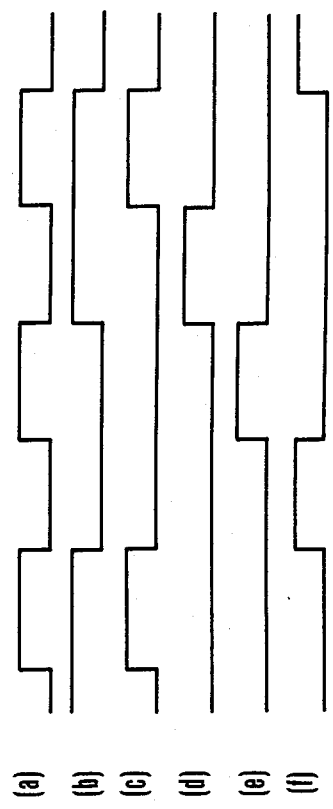
FIG. 4(A)
FIG. 4(B)

RECORDING AND REPRODUCING APPARATUS HAVING AN AUTOMATIC TRACKING CONTROL SYSTEM USING MULTIPLE PILOT SIGNALS

This is a continuation of application Ser. No. 559,222, filed Dec. 8, 1983, now abandoned.

BACKGROUND OF THE INVENTION

1. Field of the Invention

This invention relates to an information signal reproducing apparatus, and more particularly to an apparatus for reproducing an information signal which has been recorded along with one of four pilot signals, having different frequencies from one another, for every successive recording track in a predetermined order.

2. Description of the Prior Art

In the following specification, the information signal reproducing apparatus will be described using the video signal recording and reproducing apparatus. It will use a magnetic tape as the recording medium and a rotary head (hereinafter referred to as "VTR").

In conventional VTRs, for precisely tracing the same recording track during reproduction as when recorded on the recording medium, there are two methods which are either by recording control signals in the form of a pulse train, or the so-called CTL on the vicinity of the magnetic tape, or by superimposing a reference signal of a certain frequency on the video signal during recording.

The present invention involves VTRs which make use of four pilot signals of different frequencies from one another. During recording, these pilot signals are superimposed on the video signal successively, in a prescribed order, at a rate of one for every recording track.

In VTRs employing such a recording system, when switched to the reproducing mode, a reference signal, of the same frequency as that of the pilot signal, which was recorded in the principally traced recording track (hereinafter called a "reproducing track"), is multiplied by a signal from the reproducing head to obtain crosstalk components of the pilot signals for the respective adjacent tracks on either side of the reproducing track. By detecting a difference in levels between the crosstalk components, adjustment of the head position to the reproducing track is controlled.

FIG. 1 in a block form illustrates an example of the reproducing system of the prior art VTR employing such a method. The reproduced signals from heads 1 and 2 pass through a head selector circuit 11 to an amplifier 12. After having been amplified, the signal is converted to a video signal equivalent to the original one, or the video signal which was recorded in passing through a signal processor 13, and the reproduced video signal appears at an output terminal 3. The output of amplifier 12 is also applied to a low pass filter (LPF) 14 where only the above four pilot signals are allowed to pass therethrough to a multiplier 15. A signal appearing at an inlet 16 was formed in synchronization with the operation of a rotary drum with the heads 1 and 2 fixedly mounted thereon and has alternative high and low levels for a period necessary to trace one track, for example, at a frequency of 30 Hz, (hereinafter called 30PG). The 30PG is also used to control the operation of the head selector circuit 11. In synchronization with the 30PG, the circuit 17 produces the four different reference signals at a time which has the same frequency as that of the pilot signal recorded in the track which is being traced by either head 1 or head 2. The reference signal obtained by this circuit 17 is applied to the multiplier 15. That is, the 4-frequency reference signal forming circuit 17 produces four reference signals of different frequencies successively in the same frequency order as the pilot signals were recorded in the respective successive tracks.

In the multiplier 15, the reproduced pilot signals from LPF 14 are multiplied by the reference signals from the 4-frequency reference signal forming circuit 17. The reproduced pilot signals each include crosstalk components ascribable to the adjacent tracks on either side of the reproducing track. Here the four frequencies are assumed to have been recorded in an order of f1→f2→f3→f4→f1→f2 and so on, taking respective values, for example, $f1=102$ KHz, $f2=119$ KHz, $f3=165$ KHz and $f4=148$ KHz. Then, as shown in Table 1, obtained from the output of LPF 14 are not only the pilot signal which was superimposed on the reproducing track during recording, but also, another pilot signal which had been recorded just before the first pilot signal was recorded on the reproducing track. In other words, the second pilot signal was superimposed on the track just behind the reproducing track (hereinafter called the front track, as viewed in the running direction of the tape) and still another pilot signal was recorded just after the first pilot signal had been recorded, or was superimposed on the track just before the reproducing track (hereinafter called the rear track).

TABLE 1

| | Frequency in KHz | | | |
|---|---|---|---|---|
| Pilot Signal of Reproducing Track | 102 | 119 | 165 | 148 |
| Crosstalk Component from Front Track | 148 | 102 | 119 | 165 |
| Crosstalk Component from Rear Track | 119 | 165 | 148 | 102 |
| Reference Signal | 102 | 119 | 165 | 148 |
| Spectrum Arising from Crosstalk Component from Front Track | 46 | 17 | 46 | 17 |
| Spectrum Arising from Crosstalk Component from Rear Track | 17 | 46 | 17 | 46 |

On the other hand, the reference signal produced by the 4-frequency reference signal forming circuit 17 is one which has the same frequency as that of the pilot signal of the reproducing track.

For example, now assuming that the frequency of the pilot signal of the reproducing track is 119 KHz, then the crosstalk component from the front track has a frequency of 102 KHz and the crosstalk component from the rear track has another frequency of 165 KHz. As that signal and those components are multiplied by the reference signal of 119 KHz, the output of the multiplier 15 includes 238 KHz, 221 KHz, 284 KHz, 17 KHz and 46 KHz, where the components of 17 KHz and 46 KHz are spectra produced for the reason that the crosstalk components from the front and rear tracks are respectively present, and their levels represent the amount of crosstalk. The 17 KHz and 46 KHz components are taken out by band pass filters (BPF) 18 and 19 respectively. Responsive to the outputs of BPFs 18 and 19, detector circuits 20 and 21 produce outputs the difference of which represents a positional error of the head to the reproducing track. Then the outputs of detectors 20 and 21 are applied to a difference amplifier 22 controlling the operation of a capstan motor 26 until the level difference obtained by the difference amplifier 22 reaches a minimum. As is obvious from Table 1, that the spectra 17 KHz and 46 KHz, arising from the crosstalk components from the front and rear tracks, alternate each time the head moves one track. For this reason, according to the prior art, it is necessary to provide an inversion amplifier 23 and still further an additional switch 24, which changes its switched position for each track. The operation of the switch 24 is controlled by the 30 PG. Then, the signal from the switch 24 is supplied to a control circuit 25 for the capstan motor 26, thereby making it possible for the head 1 or 2 to precisely trace the same track during reproduction as during recording.

FIG. 2 illustrates another example of the prior art reproducing system which is different from the example of FIG. 1 in that instead of the inversion amplifier 23 and the switch 24, use is made of a pair of switches 27 and 28, operation of which is controlled by the 30PG. Reference numeral 29 identifies a difference amplifier. Even in this system, the frequencies arising from the crosstalks of the front and rear tracks alternate for every track. Therefore, the polarity inverts each time the head shifts one track.

Since such prior art VTRs are necessarily provided with means for fulfilling the requirement of performing the above-described inversion of polarity, by an inversion amplifier and a switch in combination, or otherwise by two switches excluding the inversion amplifier, the complexity of the circuitry is increased, and the temperature response characteristic of the inversion amplifier and the noise of the switch or switches directly affect the signal representing the detected positional error of the head to the reproducing track. Even if the actual positional error is the same, it is unavoidable that the detected positional error differs from track to track, that is, as the switches 24, 27 and 28 assume their opposite switched positions.

An object of the present invention is to provide an information signal reproducing apparatus which overcomes the above drawbacks of the prior art.

Another object is to provide an information signal reproducing apparatus in which the electrical circuitry is constructed in a simpler form.

Still another object is to provide an information signal reproducing apparatus in which the signal representing the detected positional error can be stabilized.

A further object is to provide an information signal reproducing apparatus amenable to the effective use of electrical circuitry.

SUMMARY OF THE INVENTION

To achieve these and other objects according to the present invention, the apparatus reproduces a composite signal, which was formed during recording by superimposing successively on an information signal four different frequency pilot signals in a prescribed rotation at a rate of one pilot signal for every one recording track. The apparatus includes recording a reproducing head for tracing the aforesaid track, means for producing selectively four reference signals of substantially the same frequencies as those of the respective pilot signals one at a time in a different rotation from the aforesaid rotation that occurred during recording, and means for detecting a positional error of the reproducing head from the aforesaid recording track by using the four reference signals and at least one of the four pilot signals reproduced through the reproducing head.

These and other objects and features of the present invention will become apparent from the following detailed description of embodiments thereof taken by reference to the accompanying drawings.

BRIEF DESCRIPTION OF THE DRAWINGS

FIG. 1 is a block diagram illustrating an example of the reproducing system of the prior art VTR.

FIG. 2 is similar to FIG. 1 illustrated by another example.

FIG. 4A consisting of parts a-f are a pulse timing chart illustrating a manner in which the apparatus of FIG. 3 operates during recording.

FIG. 4B consisting of parts a-f are a pulse timing chart illustrating a manner in which the apparatus of FIG. 3 operates during reproduction.

DETAILED DESCRIPTION OF THE PREFERRED EMBODIMENTS

Figure 3:
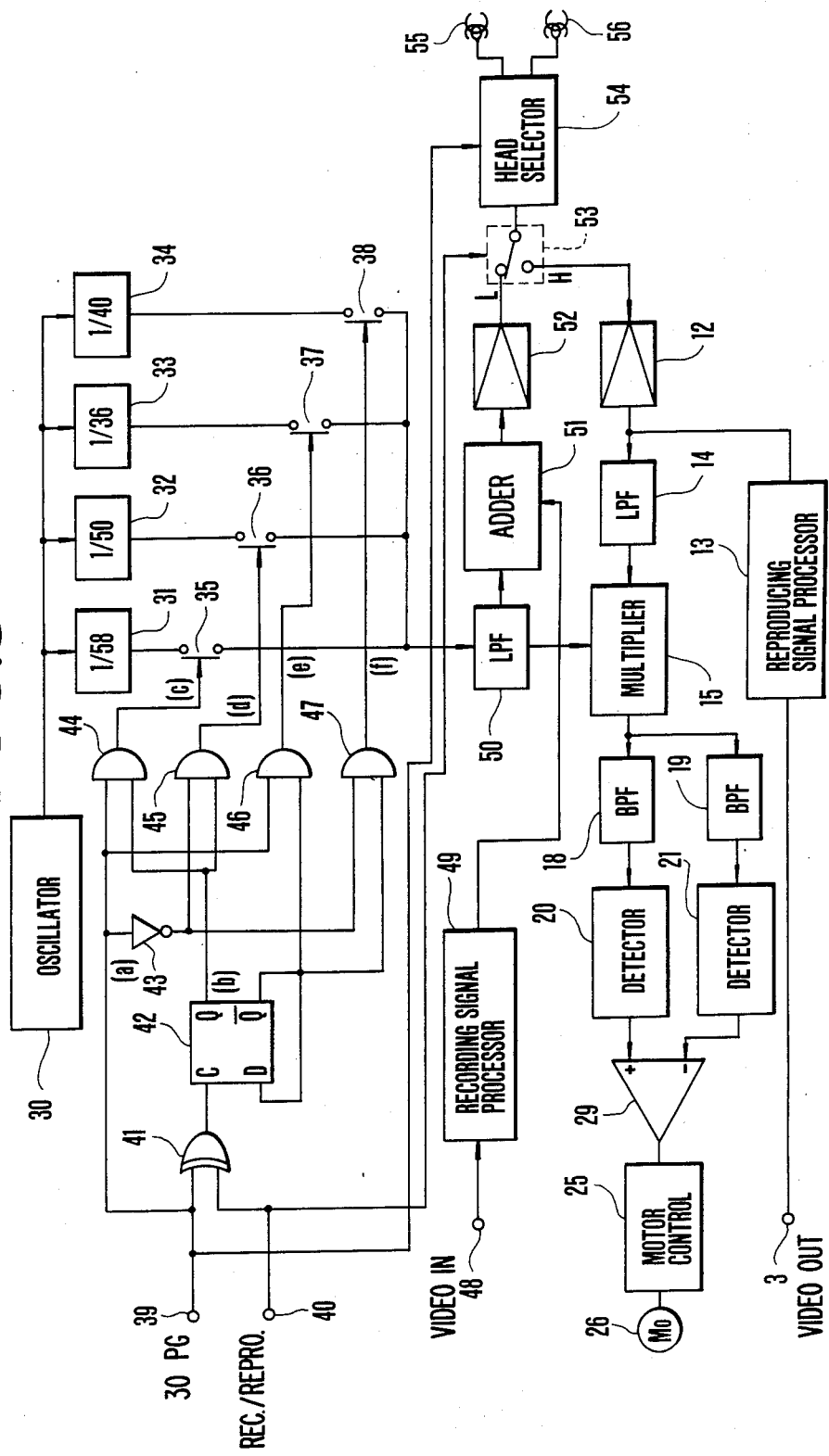
FIG. 3 is an electrical circuit diagram, partly in block form, of an embodiment of a VTR according to the present invention.

In FIG. 3 there is shown one embodiment of the present invention applied to the VTR. The same reference characters have been employed to denote the same parts as those shown in FIG. 1. An oscillator 30 produces a pulse train with a frequency of, for example, 5.947 MHz. This oscillator 30 may make use of an oscillator which is generally used, for example, in automatic phase control of color signals in the VTRs. Frequency dividers 31 to 34 have rates of 1/58, 1/50, 1/36 and 1/40, respectively, and are receptive of the output of the oscillator 30 producing outputs of about 102 KHz, 119 KHz, 165 KHz and 148 KHz, respectively. Switches 35, 36, 37 and 38 conduct when their control inputs (indicated by arrows in the drawing) are high level, and non-conducting when low level.

A signal 30PG is applied to an inlet or terminal 39. There is another inlet or terminal 40 at which appears a mode control signal which has a low level when the VTR operates in the recording mode, and high level when in the reproducing mode. The reference numeral 41 identifies an exclusive OR gate circuit (hereinafter called EX-OR).

FIG. 4A is a timing chart indicating the time sequence of events occurring at the various portions (a) to (f) of the system of FIG. 3 during recording. It is when in the recording mode that the signal 30PG shown on line (a) in FIG. 4A passes through the EX-OR 41 without alteration to a "trigger" input of a flip-flop (hereinafter F.F.). The Q output of F.F. 42 is shown on line (b). The reference numeral 43 identifies an inverter. Therefore, AND circuits 44 to 47 produce respectively outputs shown on lines (c) to (f).

That is, the AND circuits 44 to 47 change their outputs to the H level successively in the order of 44→45→46→47→44→45 and so on, and are each maintained at the H level for one field period. Responsive thereto, the switches 35 to 38 close successively in the corresponding order of 35→36→37→38→35 and so on and maintain conduction for one field period, thereby LPF 50 is supplied with a signal in which the frequency changes from 102 KHz to 119 KHz, then to 165 KHz, then to 148 KHz, then to 102 KHz, and so on at the termination of the one field period.

The output of the LPF 50, which is free from high-frequency waves, is applied as pilot signals to an adder 51. On the other hand, a video signal appearing at an input terminal 48, after having been converted to a form suited for recording by a signal processor 49, is applied to the adder 51. The output of adder 51, which represents the pilot signals superimposed on the video signal, is then applied, through an amplifier 52, a switch 53 in its "L" position and a head selector circuit 54, to either head 55 or head 56 by which the composite signal is recorded on a magnetic tape. As the operation of the switch 53 is controlled by the aforesaid signal from the terminal 40, when in the recording mode, it always takes the "L" position. The operation of the head selector circuit 54 is controlled by the signal 30PG from the terminal 39.

Referring to FIG. 4B, wherein in the reproducing mode, the terminal 40 is given a high level signal, and the EX-OR 41 produces an output equivalent to the inverted signal 30PG. Therefore, the output of the F.F. 42 differs in phase from that which was produced during recording. Responsive thereto, the AND circuits 44 to 47 change their levels to H successively in a different rotation, namely, 44→47→46→45→44→47 and so on and a high level output for one field period as will be seen from lines (c) to (f) of FIG. 4B. Therefore, the switches 35 to 38 selectively conduct in the order of 35→38→37→36→35→38 and so on and one of the selected switches 35 to 38 conducts for one field period. Then one of the four reference signals of different frequencies is applied to the LPF 50 for each field period in an order such as 102 KHz, 148 KHz, 165 KHz, 119 KHz, 102 KHz, and so on.

On the other hand, the signal picked up by either head 55 or head 56, which also serve as recording heads, is applied, through the head selector circuit 54, the switch 53 and amplifier 12, to a reproducing signal processor circuit 13 where the video signal contained in the reproduced signal returns to its original form, or to the video signal preceding the recording. The regained video signal appears at an output terminal 3. As in the recording mode, the operation of a head selector circuit 11 is controlled by the signal 30PG from the terminal 39. Also responsive to the H level signal from the terminal 40, the switch 53 always has a H level during reproduction.

Then the reproducing signal is removed from the amplifier 12 as pilot signal components by LPF 14 and are then multiplied by reference signals from the LPF 50 by multiplier 15. As shown in Table 2, the pilot signal picked up by the head 55 or 56 tracing the reproducing track and then produced from the LPF 14 changes its frequency in the same rotation as in the VTR of FIG. 1, that is, 102 KHz, 119 KHz, 165 KHz, 148 KHz, 102 KHz and so on. The rotation of the frequencies of each of the front and rear crosstalk components is also the same as in Table 1.

On the other hand, in another order the LPF 50 produces the reference signals as 102 KHz, 148 KHz, 165 KHz, 119 KHz, 102 KHz and so on shown in Table 2. In this situation, as shown in Table 2, the spectrum arising from the crosstalk component from the front track becomes 46 KHz independent from the field, and the spectrum arising from the crosstalk component from the rear track becomes 17 KHz independent from the field.

TABLE 2

|  | Frequency in KHz | | | |
| --- | --- | --- | --- | --- |
| Pilot Signal of Reproducing Track | 102 | 119 | 165 | 148 |
| Crosstalk Component from Front Track | 148 | 102 | 119 | 165 |
| Crosstalk Component from Rear Track | 119 | 165 | 148 | 102 |
| Reference Signal | 102 | 148 | 165 | 119 |
| Spectrum Arising from Crosstalk Component from Front Track | 46 | 46 | 46 | 46 |
| Spectrum Arising from Crosstalk Component from Rear Track | 17 | 17 | 17 | 17 |

Now assuming that as the load on the capstan increases, the speed of movement of the tape becomes slower than the prescribed speed, then the crosstalk component from the front track becomes larger than that from the rear track. Then, the spectrum of 46 KHz becomes higher in level than that of 17 KHz. Band pass filter BPF 18 is adapted to pass the spectrum of 46 KHz, and band pass filter BPF 19 to pass the spectrum of 17 KHz. Therefore, the output of a level detector circuit 20 becomes a higher level than that of another level detector circuit 21 so that the output voltage of difference amplifier 29 increases with an increase in the current supplied to the capstan motor 26.

It is to be understood that since the spectra of 46 KHz and 17 KHz each always indicates one and the same direction of tracking error, as compared with the prior art system of FIG. 1, the complexity of the system is reduced thanks to the omission of the inversion amplifier and switch.

It should be pointed out that the order in which the reference signals are successfully produced during reproduction is not always limited to that shown in Table 2. They may be varied in view of application, for example, to the VTR of FIG. 3 as 165 KHz, 119 KHz, 102 KHz, 148 KHz, 165 KHz and so on. For such employed reference signals, the required frequency values of the pilot signal reproduced from the reproducing track, the crosstalk component from the front track, the crosstalk component from the rear track, the spectrum arising from the crosstalk component from the front track and the spectrum arising from the crosstalk component from the rear track are listed in Table 3 below.

TABLE 3

|  | Frequency in KHz | | | |
| --- | --- | --- | --- | --- |
| Pilot Signal of Reproducing Track | 102 | 119 | 165 | 148 |
| Crosstalk Component from Front Track | 148 | 102 | 119 | 165 |
| Crosstalk Component from Rear Track | 119 | 165 | 148 | 102 |
| Reference Signal | 165 | 119 | 102 | 148 |
| Spectrum Arising from Crosstalk Component from Front Track | 17 | 17 | 17 | 17 |
| Spectrum Arising from Crosstalk Component from Rear Track | 46 | 46 | 46 | 46 |

Also because of the application of the output of the difference amplifier 29 without any alternation to the motor control circuit, the signal representing the detected positional error is very stable, permitting precise error correction in the relative position between the reproducing head and the track to be traced.

As has been described in greater detail above by using the illustrated embodiments, according to the present invention, without sacrificing the capabilities of the information signal reproducing apparatus which is to control adjustment of the relative position between the head and the recording medium with great accuracy and reliability, the circuitry can be constructed in a simpler form.

Another advantage arising from the application of the invention to another type of apparatus including the recording system is that as the recording and reproducing systems have a common IC, the number of necessary pins is remarkably reduced, and the circuitry scale is also minimized.

It is to be noted that though the foregoing embodiments of the invention have been illustrated in connection with the use of the capstan with which the operation is controlled to correct positional error, the head may be otherwise arranged to change its position in the direction of rotation thereof by putting the head on the free end of a bimorph or other electro-mechanical element in fixedly secured relation, where that bimorph is operated to correct positional error.

What I claim:

1. An information signal recording and reproducing apparatus having an automatic tracking control system, comprising:
   (a) generating means for selectively outputting four kinds of pilot signals having different frequencies from one another;
   (b) adding means for adding an output signal of said generating means onto an information signal to form an added signal;
   (c) recording and reproducing head means for recording the added signal onto a record bearing medium and for reproducing the added signal from the record bearing medium, said recording and reproducing head means including at least one rotating head;
   (d) separating means for separating four kinds of pilot signals from the added signal reproduced by said head means;
   (e) tracking control means for controlling positions of said head means and the record bearing medium, relatively, on the basis of the output signal of said generating means and the pilot signals separated by said separating means;
   (f) binary signal forming means for forming a first binary periodic information and a second binary periodic information based on a rotation period of the rotating head, the period of the first binary periodic information being equal to two times the period of the second binary periodic information;
   (g) selection control means for controlling a selecting action of said generating means based on the first binary periodic information and the second binary periodic information;
   (h) manually operable means for producing a mode designation signal by which the apparatus is switched between a first mode, where said head means is performing a recording operation, and a second mode, where said head means is performing a reproducing operation; and
   (i) phase shifting means for shifting phases of the first binary periodic information and the second binary periodic information supplied to the selection control means, on the basis of the mode designation signal.

2. An apparatus according to claim 1, wherein said phase shifting means shifts the phase of the first binary periodic information by 90°.

3. An apparatus according to claim 1, wherein said tracking control means includes means for moving the record bearing medium.

4. An apparatus according to claim 1, wherein said four kinds of pilot signals have respective frequencies $f1$, $f2$, $f3$, and $f4$ in such a relation that $f2-f1=f3-f4$ and $f4-f1=f3-f2$.

5. An apparatus according to claim 4, wherein said tracking control means includes forming means for producing a composite signal of an output signal from said generating means and the pilot signal separated by said separating means.

6. An apparatus according to claim 5, wherein for $f4-f1=fa$ and $f2-f1=fb$, said tracking control means includes a circuit for separating from each other an fa component and fb component of the composite signal produced by said forming means, and means for comparing amplitudes of the separated fa and fb components with each other.

7. An apparatus according to claim 1, wherein said generating means includes an oscillator for producing a signal having a predetermined frequency and four frequency dividers for dividing the frequency of the output signal of said oscillator, said four frequency dividers producing a first signal, a second signal, a third signal and a fourth signal having different frequencies, respectively.

8. An apparatus according to claim 1, wherein said first binary information and said second binary information are rectangular signals.

* * * * *